United States Patent [19]

Fujimoto et al.

[11] Patent Number: 5,253,039
[45] Date of Patent: Oct. 12, 1993

[54] PROCESS AND APPARATUS FOR MEASURING SIZES OF STEEL SECTIONS

[75] Inventors: Yoji Fujimoto; Yoshimi Fukutaka; Takanori Okui; Kazushi Baba; Eiji Nakashima; Atsushi Hatanaka, all of Kurashiki; Yasunori Kuroda, Kobe; Hidenobu Adachi, Kobe; Toshiaki Mori, Kobe, all of Japan

[73] Assignee: Kawasaki Steel Corporation, Kobe, Japan

[21] Appl. No.: 775,753

[22] Filed: Oct. 15, 1991

[30] Foreign Application Priority Data

Oct. 19, 1990 [JP] Japan ................................ 2-278930
Dec. 6, 1990 [JP] Japan ................................ 2-400592
Dec. 28, 1990 [JP] Japan ................................ 2-418091
Feb. 27, 1991 [JP] Japan ................................ 3-53644

[51] Int. Cl.$^5$ ............................................. G01B 11/08
[52] U.S. Cl. .................................. 356/372; 356/376; 356/381; 356/385
[58] Field of Search ................. 356/1, 4, 5, 372, 376, 356/381, 384, 385, 386, 387

[56] References Cited

U.S. PATENT DOCUMENTS

| 3,899,663 | 8/1975 | Pirlet | 356/376 |
| 4,227,812 | 10/1980 | Pirlet | 356/372 |
| 4,227,813 | 10/1980 | Pirlet | 356/372 |

FOREIGN PATENT DOCUMENTS

| 3601386 | 5/1987 | Fed. Rep. of Germany. | |
| 3936513 | 4/1991 | Fed. Rep. of Germany. | |
| 26703 | 2/1982 | Japan | 356/376 |
| 254304 | 10/1990 | Japan | 356/376 |

OTHER PUBLICATIONS

Patent Abstracts of Japan, vol. 15, No. 005 (P-1149) Jan. 8, 1991, JP-A-2 254 304 (Sumimoto Metal Ind., Ltd.) Oct. 15, 1990.
Patent Abstracts of Japan, vol. 8, No. 183 (P-296) Aug. 23, 1984, JP-A-59 075 110 (Daido Tokushuko KK).
Patent Abstracts of Japan, vol. 5, No. 46 (P-54) Mar. 27, 1981, JP-A-56 001 305 (Sumimoto Metal Ind., Ltd.).
Patent Abstracts of Japan, Vo. 5, No. 17 (P-47) Jan. 31, 1981, JP-A-55 147 303 (Nireko KK).

*Primary Examiner*—F. L. Evans
*Attorney, Agent, or Firm*—Oliff & Berridge

[57] ABSTRACT

In the size measurement of steel sections, a pair of two-dimensional rangefinders and a pair of one-dimensional rangefinders are arranged so as to sandwich a steel section consisting of a pair of flange portions and a web portion in a widthwise direction of the flange portion and face to each other, whereby a vertical distance ranging from the two-dimensional rangefinder to the flange portion and a vertical distance ranging from the one-dimensional rangefinder to the web portion are measured, respectively to calculate a deviation at center, a flange width and a web thickness from the above measured values. In this case, a laser rangefinder is used as each of the two-dimensional rangefinder and one-dimensional rangefinder.

9 Claims, 14 Drawing Sheets

FIG_1a  FIG_1b  FIG_1c  FIG_1d
FIG_2
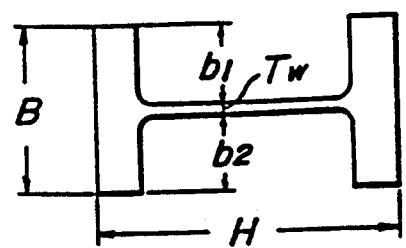
FIG_3
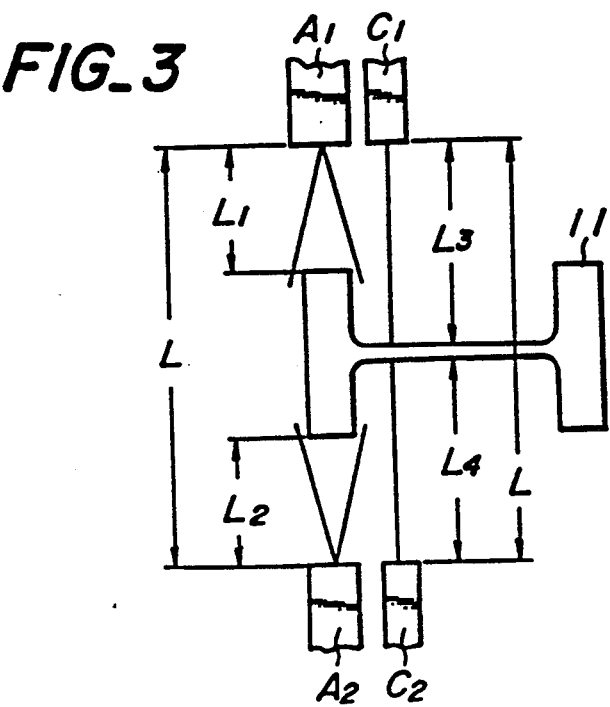

FIG_7

FIG_10
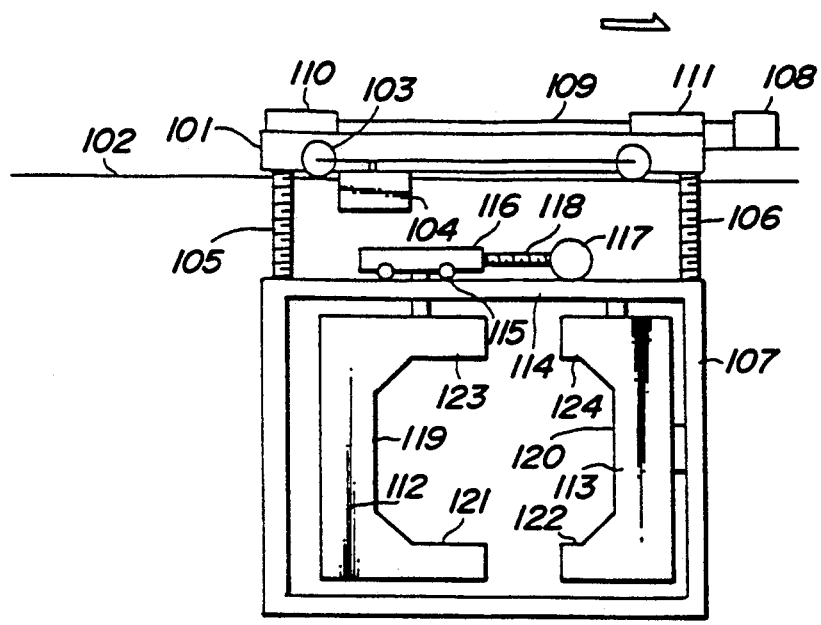
FIG_11
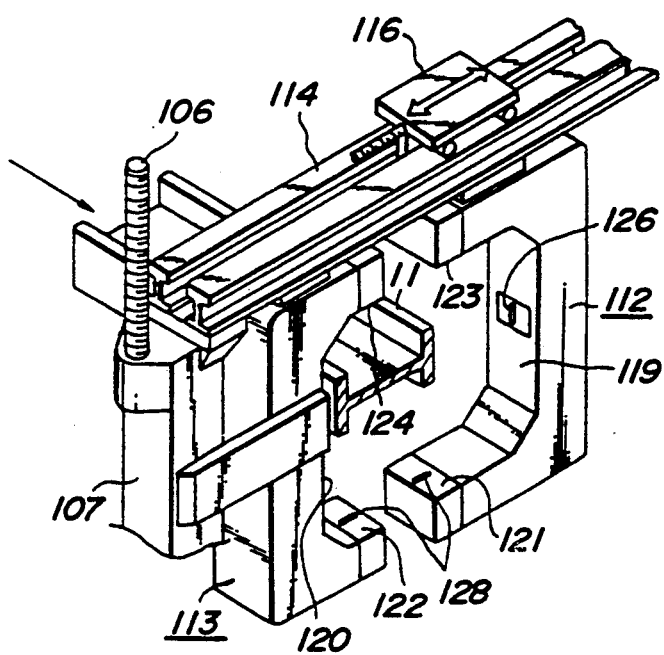

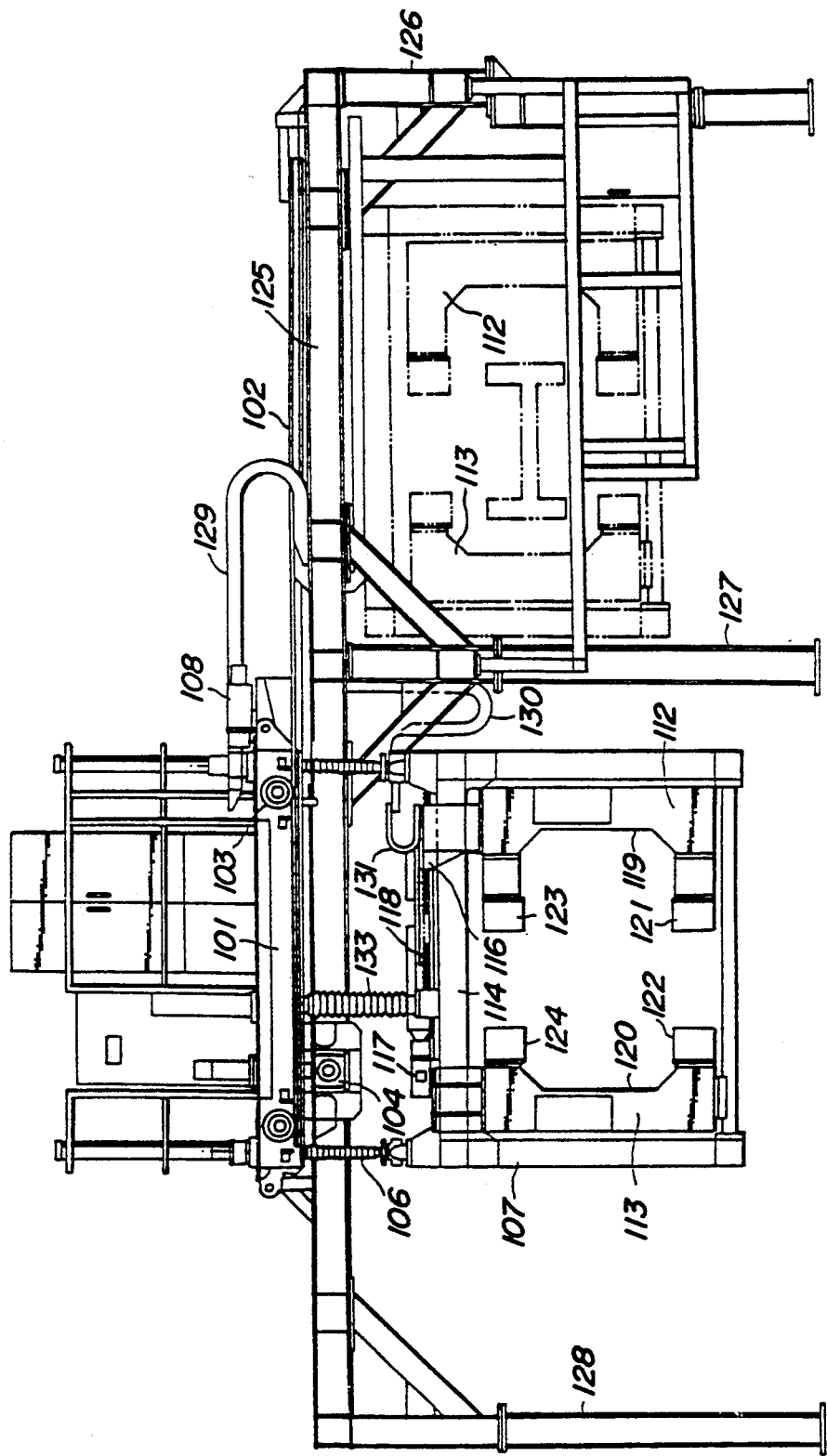
FIG._12

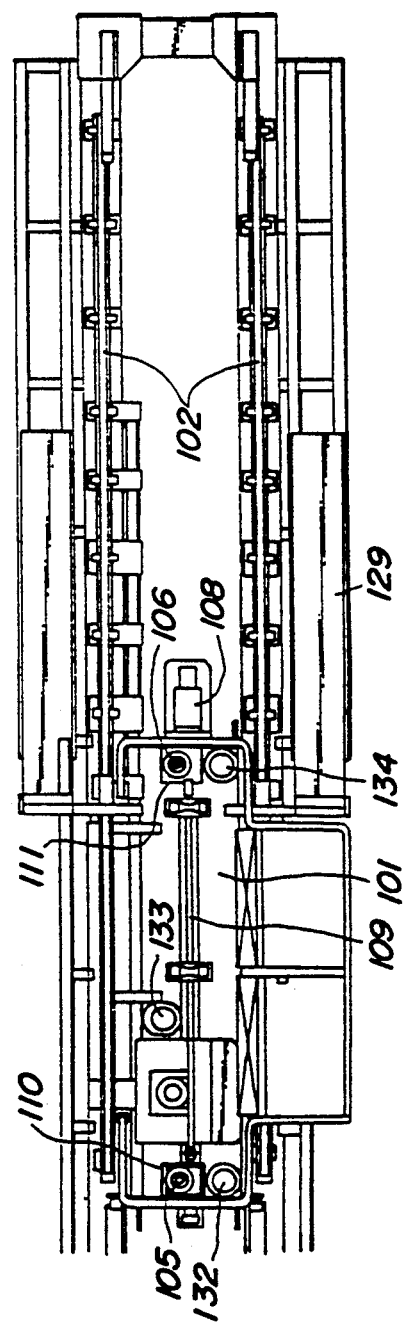
FIG._13

FIG_14
FIG_15
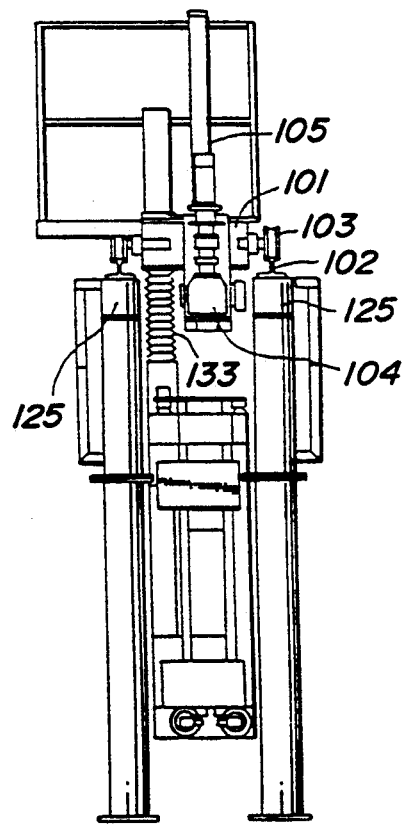
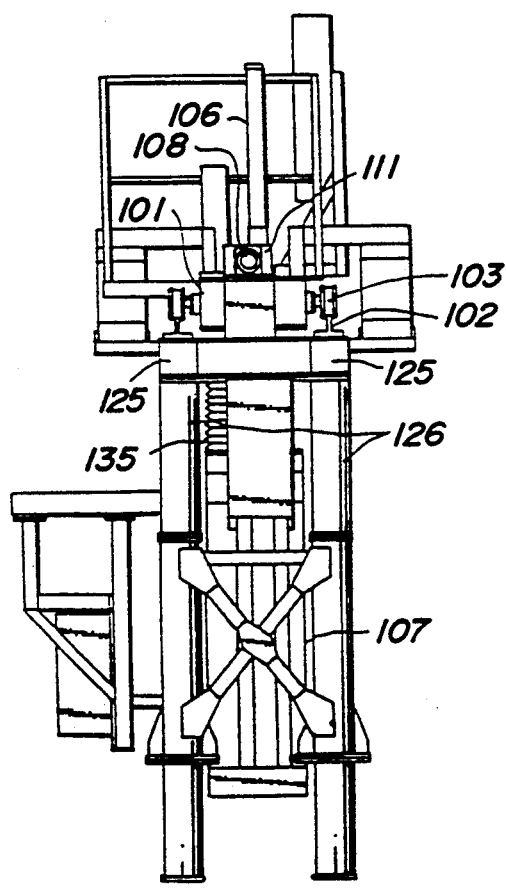

FIG_16a
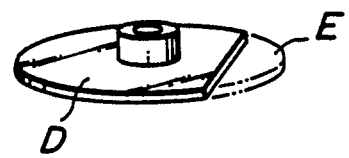
FIG_16b
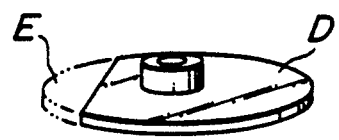
FIG_16c
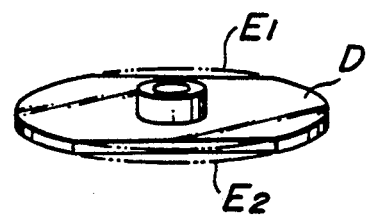
FIG_16d
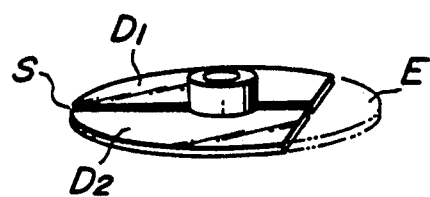

FIG_17
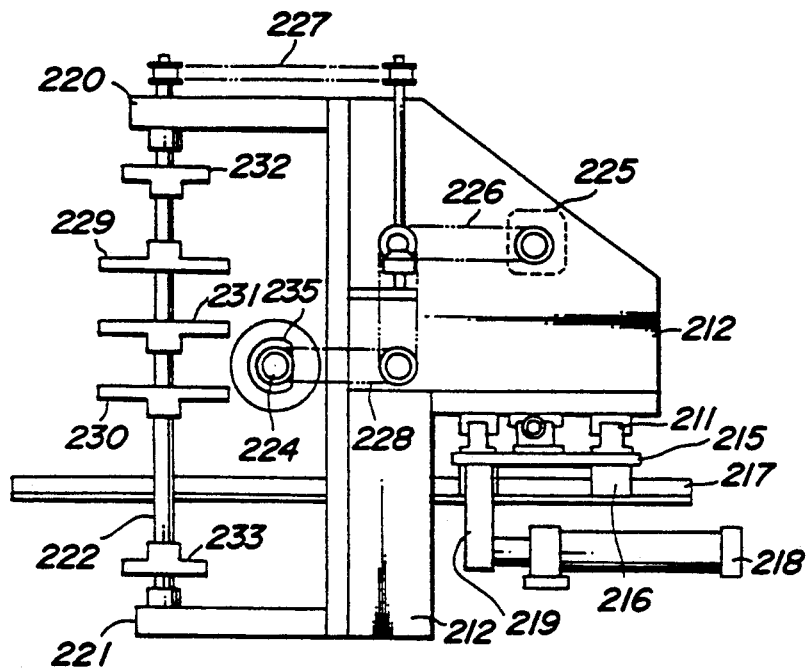
FIG_18
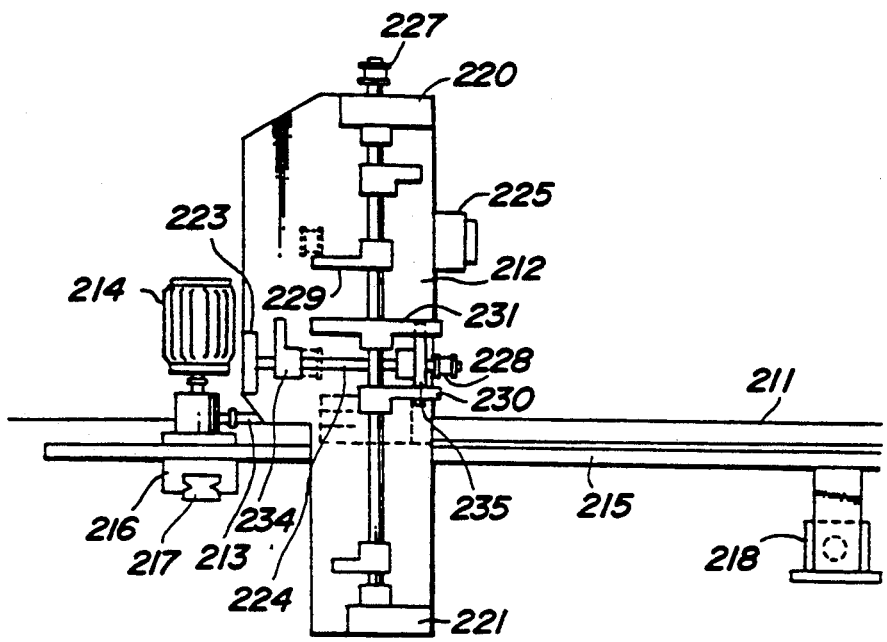

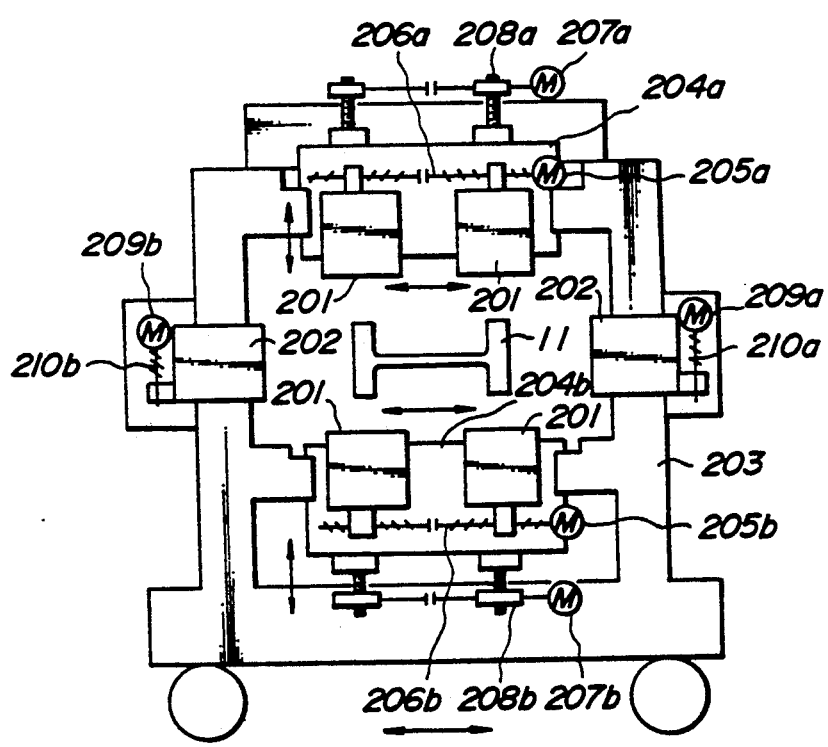
FIG_19

PROCESS AND APPARATUS FOR MEASURING SIZES OF STEEL SECTIONS

BACKGROUND OF THE INVENTION

1. Field of the Invention

The present invention relates to a process and an apparatus for measuring sizes of steel sections such as H-sections, I-sections and the like, and more particularly to a process and an apparatus for size measurement capable of continuously and accurately measuring sizes of the steel section not only at a static state but also at a running state (hot rolling, cold rolling and the like). Further, the invention relates to a process and an apparatus for calibrating a laser range finder used for the size measurement of the steel section.

2. Description of Related Art

Heretofore, the measurement of sizes such as flange width, flange thickness, web thickness, deviation at center and the like in steel sections such as H-section, I-section and so on has mainly been carried out by manual measurement using vernier calipers, dial gauge or the like because of various shapes of the steel sections. However, such a manual measurement has drawbacks that the reproducibility is poor due to the difference among individuals, and the measurement takes a long time and the like. Therefore, it is strongly demanded to develop automatic measurement for the size of the steel section.

For this purpose, there have been disclosed the measurement of deviation at center in Japanese patent laid open No. 57-110901, measurement of sizes in H-sections such as deviation at center (web deviation) and the like in Japanese Patent laid open No. 57-144404, measurement of deviation at center and flange width in Japanese Patent laid open No. 58-179515, respectively, as a process for continuously measuring sizes of H-sections during the running at the hot rolling step.

In Japanese Patent laid open No. 57-110910, however, an ultrasonic rangefinder of water column system is used, so that in order to measure a maximum value of flange width in the steel section to be measured, it is required to considerably increase a guiding accuracy for the prevention of rolling of the section. Since the diameter of the water column is practically about 20 mm, if the rolling of the section to be measured is caused, the position to be measured is shifted and the measurement becomes impossible. Further, water used for the measurement gets on the surface of the web portion during the measurement to promote the cooling of the web and hence the temperature difference between the web portion and the flange portion becomes large. As a result, there are caused problems that the waving of the web portion is caused in the H-sections having thin web thickness and rust occurs in the web portion due to the above water leakage.

In Japanese Patent laid open No. 57-144404, a method of cutting lights from up and down directions and right and left directions is used as a measuring system, so that the measuring accuracy is bad and also the calculation accuracy on deviation at center and the like naturally becomes poor. Further, it is difficult to conduct the measurement under an atmosphere containing water droplets, steam or the like, so that there is caused a problem in the measurement at a position close to a rolling mill (for hot rolling).

In Japanese Patent laid open No. 58-179515, the flange width is detected by means of an image sensor such as CCD (charge coupled device) or the like attached to a box type bridge guide and also the deviation at center and web thickness are calculated from values measured by a water stream ultrasonic range finder attached to the same bridge guide. In this case, it is required to guide the steel section to be measured into the inside of the bridge guide, but there is no room against the rolling of the section during the passing through the bridge guide. For this end, the bridge guide itself is made rigid and the guiding at entrance and delivery sides is ensured to prevent the rolling of the section, otherwise there is caused a fear of damaging the equipment. Moreover, even if the equipment is strengthened, the measuring accuracy may lower due to vibrations of the bridge guide and sensors attached thereto.

In the aforementioned references, the maximum value of flange width is not measured while exactly taking an edge shape of the flange portion, so that the measuring accuracy is fundamentally poor.

In Japanese Patent laid open No. 2-254304 is proposed an apparatus for the shape measurement of steel sections comprising a pair of stage mechanisms arranged so as to sandwich the steel section from up and down directions and moving toward horizontal and vertical directions, laser displacement meters attached to the stage mechanisms and detecting vertical and horizontal positions of the steel section, and a data processing device calculating the shape of the steel section from values detected by the laser displacement meters.

In the above apparatus, however, the flange widths, flange thicknesses, web thicknesses and the like at right and left sides of the steel section are measured while moving three pairs of up and down laser displacement meters inside a frame, so that the time is considerably taken for continuously measuring the steel section at an on-line state and hence the measurement becomes inefficient.

In the size measurement of the steel section, it is required to measure the maximum value of flange width and deviation at center with a high accuracy by exactly taking the edge shape of the flange portion even if the steel section to be measured causes the rolling phenomenon during the running at the hot rolling line.

In this connection, the flange portion of H-sections takes various edge shapes as shown in FIGS. 1a to 1d. On the other hand, if the rolling is caused in the running steel section during the measurement, it can not completely be controlled. Therefore, even if the rolling is caused, it is important to exactly take the edge shape of the flange portion in the steel section in order to accurately measure the maximum value of the flange width.

Here, the deviation at center S of the H-section is a value calculated from foot lengths $b_1$, $b_2$ in FIG. 2 according to the following equation:

$$S=(b_1-b_2)/2$$

Therefore, in order to obtain the value of the deviation at center S with a high accuracy, it is important to accurately measure the foot lengths $b_1$, $b_2$ by exactly taking the edge shape of the flange portion.

As to thick or thin sheets, it is possible to measure only the thickness of the sheet at an on-line state for hot rolling as described, for example, in Japanese Patent laid open No. 59-183315 and No. 61-17008. However, such a measurement of the sheet thickness is naturally unsuitable for measuring the size of the steel sections because these sections have many sizes to be measured such as web height, flange width, deviation at center and the like and also because the measuring positions change for each series of rolling line.

In this connection, if many sensors are used, the measurement is possible, but there are many difficulties in view of the setting space for the sensors and the processing of signals therefrom and the cost becomes increased. Therefore, apparatuses for measuring multi-dimensional sizes at hot state do not yet come into practical use.

In order to measure the sizes of hot rolled steel sheets such as steel sections at hot state in the hot rolling line, it is first required that the measurement on many sizes of the steel section such as flange height, flange width, deviation at center and the like is adapted to fluctuations of rolling size and rolling series. In addition, it is required that the measurement apparatus has a room for accepting the warp or bending of the section (about 20 mm in each of up and down and right and left directions) and further the apparatus is escaped toward an off-line position in case of conducting no measurement to prevent the occurrence of troubles such as kicking and the like.

Recently, a laser rangefinder is frequently used when the sizes of the steel section such as H-sections, I-sections and the like are measured even in the conventional techniques as mentioned above. In this case, it is required to rapidly calibrate the laser rangefinder for adequately measuring the sizes of the steel section irrespectively of static state or on-line state for hot rolling or cold rolling. The term "calibration" used herein is a general meaning for determining a relation between a value indicated by the measuring device and a true value using a standard device and standard specimen. Moreover, a disc-shaped calibrating member is used as the above standard device and specimen.

For example, a method of calibrating the laser rangefinder is disclosed in Japanese Patent laid open No. 2-115711. This is a system that the calibration of the laser rangefinder is carried out by irradiating a laser beam to the surface of the calibrating member, and a distance ranging from the calibrating member to the laser rangefinder is carried out by determining a moving distance along a linear guide through a high accuracy distance detecting device such as a magnetic scale or the like. However, this system can not be adopted for a case that the measurement is carried out by properly changing the distance toward the steel section to be measured under such a circumstance that the magnetic scale is arranged close to the rolling mill (particularly influence of vibrations) from a view point of the calibrating time and calibrating accuracy, so that it is only used as a calibration method at an off-line state before the incorporation into an existing machine.

Furthermore, the calibration of a thickness indicator is disclosed in Japanese Patent laid open No. 59-54913. This calibration is applied to thickness indicators using a radiation source such as $\gamma$-ray or the like. In this case, however, a procedure for intermittently rotating the calibrating member having a stepwise thickness for each given angle becomes troublesome. Moreover, when using the laser rangefinder (which has a small beam spot size and is dependent upon the measuring cycle speed), the measurement is largely influenced by the roughness of machined surface in the calibrating member (surface roughness) and the rotating speed of the calibrating member (speed passing on flat portion), so that there are many problems from a viewpoint of the accuracy, which is not disclosed in this reference.

If it is intended to measure various sizes of the steel section at once by using the laser rangefinder, the acceptable time for the calibration of the laser rangefinder at on-line state is restricted by rolling pitch and the like, and also it is required to make the calibrating time per one sensor minimum.

Various sizes of the steel section to be measured are shown in FIG. 2. In general, the flange width B is 150–520 mm, and the web height H is 300–940 mm. In the apparatus for the size measurement of steel sections arranged close to the rolling mill, therefore, it is important how to calibrate the linearity of such a size range with a high accuracy for a short time. In any case, the calibration of the laser rangefinder arranged close to the mill is dependent upon how to accurately measure the distance up to the surface of the section to be measured. However, in the aforementioned calibration, the high accuracy linear scale (e.g. magnetic scale or the like) moves under environment, particularly vibration during the measurement to lower the accuracy.

SUMMARY OF THE INVENTION

It is, therefore, an object of the invention to provide a process for measuring sizes of steel sections with a high accuracy which can follow the rolling of the section to be measured and exactly take an edge shape of a flange portion of the section even during the passing through the hot rolling mill.

It is another object of the invention to provide an apparatus for the size measurement of steel sections having a compact structure which can measure various sizes of the section not only at static state but also at on-line state for rolling.

It is the other object of the invention to realize a calibration of a laser rangefinder, which measures various sizes of the steel section widely varying every section size or rolling series, with a high accuracy in a short time without being actually influenced by conditions inherent to the measuring environment as previously mentioned.

According to a first aspect of the invention, there is the provision of a process for measuring sizes of steel sections, which comprises arranging a pair of two-dimensional rangefinders and a pair of one-dimensional rangefinders so as to sandwich a steel section consisting of a pair of facing flange portions and a web portion in a widthwise direction of the flange portion;

measuring a vertical distance ranging from the two-dimensional rangefinder to the flange portion and a vertical distance ranging from the one-dimensional rangefinder to the web portion, respectively; and calculating a deviation at center, a flange width and a web thickness from the above measured values.

In a preferred embodiment of the first invention, a laser rangefinder is used as each of the two-dimensional rangefinder and one-dimensional rangefinder. That is, the use of the laser rangefinder gives a high measuring accuracy and is durable to environments such as heat and the like in rolling mills and also interchangeable, so that it is particularly advantageous in a case that there are many positions to be measured, for example, in steel sections.

According to a second aspect of the invention, there is the provision of an apparatus for measuring sizes of steel sections each consisting of a pair of flange portions and a web portion at on-line state for rolling, comprising a pair of upper two-dimensional rangefinders arranged above the flange portions in the widthwise direction of the steel section so as to measure width and thickness at upper end of each flange portion, a device for adjusting a position of the upper two-dimensional rangefinder, a pair of upper one-dimensional rangefinders each attached to the upper two-dimensional rangefinder at a free distance therefrom in the widthwise direction of the steel section so as to measure a distance ranging to an upper surface of the web portion, a device for adjusting a position of an upper sensor so as to freely lift up and down the upper two-dimensional rangefinder, the position adjusting device and the upper one-dimensional rangefinder together in a height direction, a pair of lower two-dimensional rangefinders arranged beneath the flange portions in the widthwise direction of the steel section so as to measure width and thickness at the upper end of each flange portion, a device for adjusting a position of the lower two-dimensional rangefinder, a pair of lower one-dimensional rangefinders each attached to the lower two-dimensional rangefinder at a free distance therefrom in the widthwise direction of the steel section so as to measure a distance ranging to a lower surface of the web portion, a device for adjusting a position of a lower sensor so as to freely lift up and down the lower two-dimensional rangefinder, the position adjusting device and the lower one-dimensional rangefinder together in a height direction, and a truck supporting the upper and lower sensor position adjusting devices together and moving between transporting rolls in a direction perpendicular to a pass line of the steel section.

According to a third aspect of the invention, there is the provision of an apparatus for measuring sizes of steel sections each consisting of a pair of flange portions and a web portion at on-line state for rolling, comprising a truck arranged in a rolling pass line of the steel section so as to linearly and retractably move from an on-line position to an off-line position in a direction perpendicular to the rolling pass line, a rectangular frame attached to the truck so as to lift up and down in a vertical direction, a pair of horseshoe support frames arranged inside the rectangular frame so as to face each other and to movably approach and separate away one of the support frames against the other support frame, a pair of laser rangefinders arranged in inner faces of opposed base portions of the horseshoe support frames, and a set of a two-dimensional rangefinder and a one-dimensional rangefinder arranged in upper and lower faces of opposed foot portions of each of the horseshoe support frames.

According to a fourth aspect of the invention, there is the provision of a process for the calibration of a laser rangefinder, which comprises successively irradiating laser beam from a laser rangefinder onto calibrating faces of plural disc-shaped calibrating members arranged on a calibrating spindle in parallel with an irradiation beam axis of the laser rangefinder at a given interval, each having a notch(s) of a different phase and rotating with the spindle, whereby values measured by the laser rangefinder are simultaneously calibrated.

According to a fifth aspect of the invention, there is the provision of an apparatus for the calibration of a laser rangefinder, comprising a calibrating base, a calibrating spindle supported on the calibrating base through bearing, a plurality of disc-shaped calibrating members arranged on the calibrating spindle at a given interval each having a notch(s) of a different phase.

In a preferred embodiment of the calibration apparatus, the disc-shaped calibrating member has plural calibrating faces defined at stepwise difference.

BRIEF DESCRIPTION OF THE DRAWINGS

The invention will be described with reference to the accompanying drawings, wherein:

FIGS. 1a to 1d are schematic views showing various edge shapes in a flange portion of an H-section;

FIG. 2 is a schematic view defining sizes of an H-section;

FIG. 3 is a schematic view showing arrangements of rangefinders and a measuring procedure thereof;

FIG. 10 is a schematic view showing a main part of the other apparatus for measuring sizes of H-section;

FIG. 11 is a schematic view showing a measuring procedure of the apparatus shown in FIG. 10;

FIGS. 12, 13 and 14 are schematically front, plan and side views of the apparatus shown in FIG. 10, respectively;

FIG. 15 is a schematic view showing a main part of the apparatus shown in FIG. 10;

FIGS. 16a to 16d are perspective views of various embodiments of the disc-shaped calibrating member according to the invention;

FIGS. 17 and 18 are schematically side and front views of a calibration apparatus used in the size measurement of H-section, respectively;

FIG. 19 is a schematic view of an apparatus for measuring sizes of H-section using the above calibration apparatus.

DESCRIPTION OF THE PREFERRED EMBODIMENTS

At first, the invention will be described with respect to selection and arrangement of the rangefinder and a calculation logic thereof using H-section consisting of a pair of flange portions and a web portion as a steel section.

FIG. 3 shows the arrangement of the rangefinder and measuring procedure thereof.

As shown in FIG. 3, a pair of rangefinders $A_1$, $A_2$ for measuring a distance up to a flange portion of the H-section are arranged so as to face each other in a direction sandwiching a flange width of the H-section. In this case, a two-dimensional laser rangefinder is used for such purposes that the measurement can be carried out even if the rolling of the H-section occurs during the passing and that it is necessary to exactly take the edge shape of the flange portion.

Figure 4:
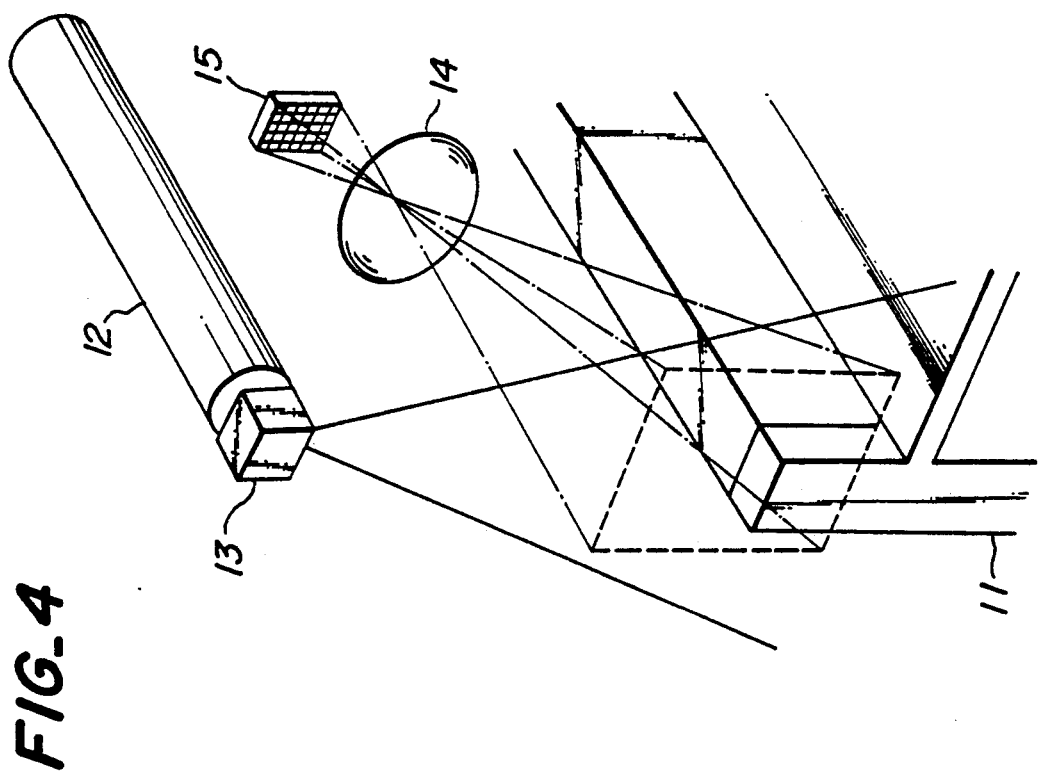
FIG. 4 is a schematic view showing a measuring theory of two-dimensional laser rangefinder.

Here, the measuring theory of the two-dimensional laser rangefinder will be described with reference to FIG. 4, As shown in FIG. 4, a laser beam from He-Ne laser generator 12 is projected onto a flange portion of an H-section 11 as a band-like laser beam through a collimator 13. Then, laser beams irregularly reflected on the flange portion are caught through a lens 14 and received onto a two-dimensional rangefinder 15 containing many detecting sensors therein. In this way, the edge shape of the flange portion can exactly be taken and also the maximum value of the flange width can be measured.

In FIG. 4, a measurable range for the edge shape of the flange portion is shown by dotted lines, which is sufficiently wide against the flange width of the H-section to be measured. Thus, an acceptable range for the measurement of flange width against the rolling phenomenon produced during the passing of the H-section can sufficiently be enlarged.

On the other hand, a pair of rangefinders $C_1$, $C_2$ measuring a distance up to a web portion of the H-section are arranged so as to face to each other in a direction sandwiching the web portion. In this case, a one-dimensional laser rangefinder is used as the rangefinder.

Moreover, a one-dimensional part in the two-dimensional laser rangefinder may be utilized as the rangefinder $C_1$, $C_2$, but the accuracy is considerably poor as compared with the case of using the two-dimensional rangefinder.

By measuring the above distances with the combination of these rangefinders, deviation at center S, flange width B and web thickness $T_w$ of the H-section are calculated from FIG. 3 according to the following equations:

$$S = [(L_3 - L_1) - (L_4 - L_2)]/2$$

$$B = L - (L_1 + L_2)$$

$$T_w = L - (L_3 + L_4)$$

Although the distance between the rangefinders $A_1$ and $A_2$ and the distance between the rangefinders $C_1$ and $C_2$ are the same distance L in FIG. 3, such distances may be different.

Moreover, when a set of a pair of two-dimensional laser rangefinders and a pair of one-dimensional laser rangefinders is also arranged on a right side of FIG. 3 as rangefinders $A_3$, $A_4$, $C_3$, $C_4$ (not shown), all of the deviation at center, flange width and web thickness in both sides of the H-section can be measured.

Moreover, the resolution of the rangefinder determines the measuring accuracy, so that the position of the rangefinder against the steel section to be measured becomes important.

Therefore, it is desirable that the rangefinder is moved and set to an optimum position in accordance with the shape of the H-section in order to hold the good measuring accuracy.

As a typical size of H-section, there are narrow width type of H400×150−H900×300, wide width type of H300×300−H500 and the like. Therefore, the rangefinders are set to optimum positions by means of a mechanism of moving the rangefinder in accordance with these flange width and web height.

Furthermore, when the web height is low and the rangefinders approach and interfere with each other, the measurement can be made by shifting the phases of the rangefinders.

In this case, it is enough to mutually shift the rangefinders to each other by a phase difference in the longitudinal direction of the steel section to be measured. That is, the measuring positions of the rangefinders are different in the longitudinal direction of the steel section. Such a positioning may be made by tracking the steel section, counting the tracking length with PLG (pulse generator) or the like and calculating the resulting data.

Figure 5:
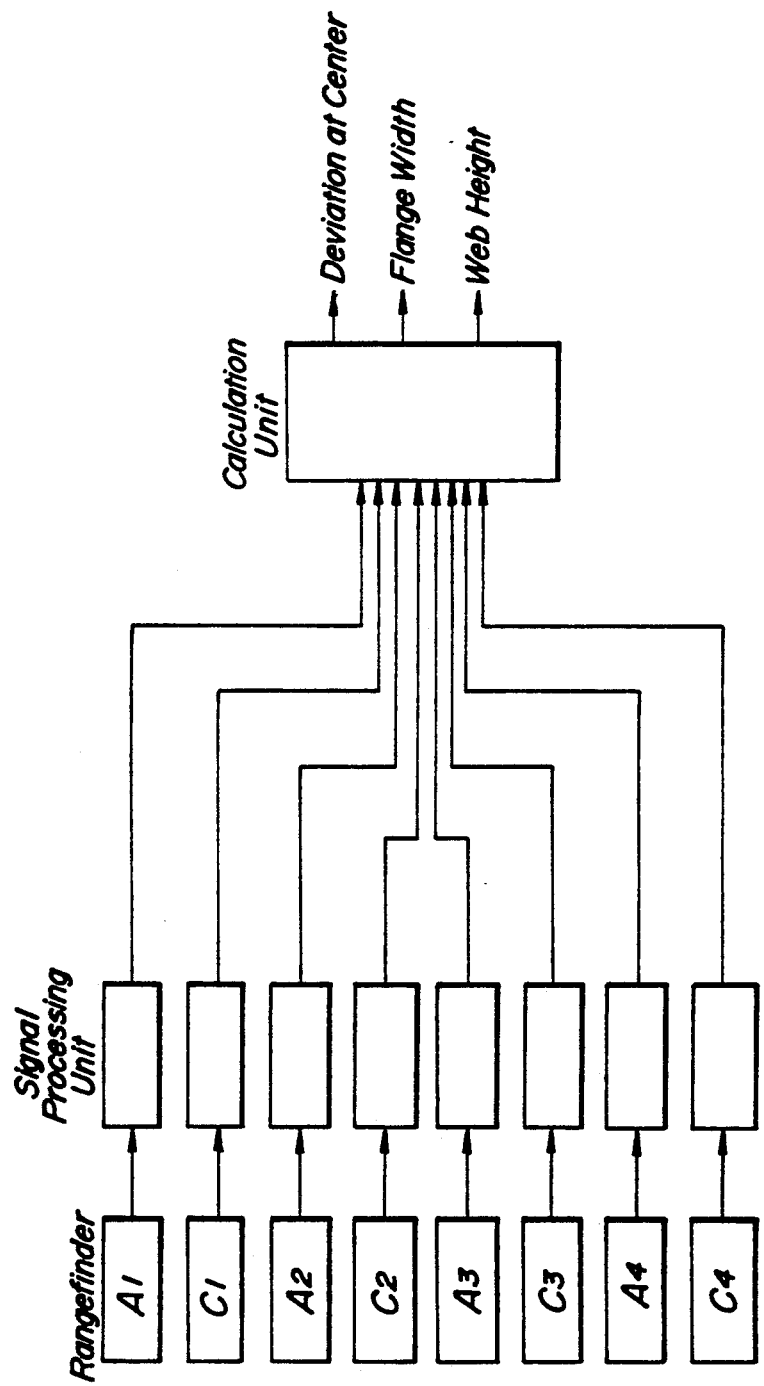
FIG. 5 is a block diagram for measuring sizes of H-section by a system using two-dimensional and one-dimensional rangefinders.

In FIG. 5 is shown a structure of the size measuring system, in which signals output from the rangefinders $A_1$, $A_2$, $A_3$, $A_4$, $C_1$, $C_2$, $C_3$, $C_4$ are supplied to respective signal processing units. In the signal processing units, the distance values are calculated and further supplied to a calculation unit, at where the deviation at center, flange width and web height are calculated.

A first embodiment of the apparatus for the size measurement of H-section according to the invention will be described with reference to FIG. 6.

Figure 6:
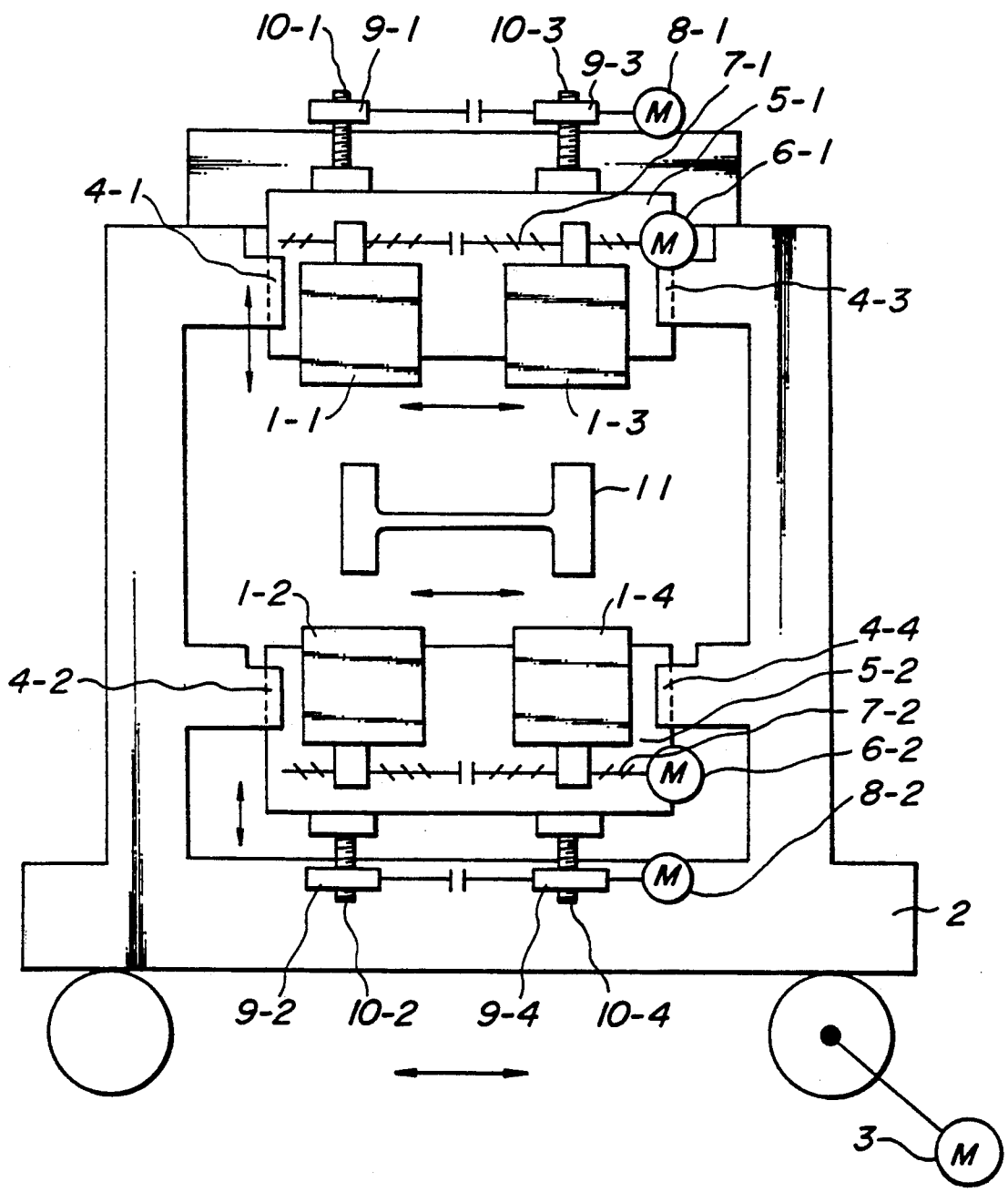
FIG. 6 is a schematic view showing an attachment of each rangefinder used in an apparatus for measuring sizes of H-section and a moving mechanism of the apparatus.

FIG. 6 shows the arrangement of each rangefinder and the moving mechanism therefor in the size measuring apparatus of the H-section.

Each of sensors 1-1, 1-2, 1-3 and 1-4 is a set of two-dimensional laser rangefinder and one-dimensional laser rangefinder. The sensors 1-1 and 1-3 are slidably attached to a sensor frame 5-1, while the sensors 1-2 and 1-4 are slidably attached to a sensor frame 5-2, whereby these sensors can be moved in the lateral direction.

The sensor frame 5-1 is attached to a truck frame 2 through sliding guides 4-1, 4-3, and also the sensor frame 5-2 is attached to the truck frame 2 through sliding guides 4-2, 4-4, whereby the sensor frames as well as the sensors attached thereto can be moved in up and down directions.

The movement of the sensor in the lateral direction is carried out as follows. That is, the sensors 1-1, 1-3 are moved by a synchro motor 6-1 through a screw shaft 7-1, while the sensors 1-2, 1-4 are moved by a synchro motor 6-2 through a screw shaft 7-2.

Each of the screw shafts 7-1, 7-2 has threads of opposite direction on opposite side portions thereof, respectively, so that when the screw shaft is rotated in a certain direction, the sensors 1-1, 1-3 or the sensors 1-2, 1-4 move to each other in the opposite direction. Moreover, the synchro motor 6-1 and 6-2 may be synchronized with each other.

By using such lateral moving mechanisms, the lateral positions of these sensors are set to optimum positions in accordance with the web height of the steel section to be measured, i.e. H-section 11.

On the other hand, the sensors 1-1, 1-3 are moved in up and down directions by a synchro motor 8-1 through worm reduction gears 9-1, 9-3 and screw shafts 10-1, 10-3, while the sensors 1-2, 1-4 are moved in up and down directions by a synchro motor 8-2 through worm reduction gears 9-2, 9-4 and screw shafts 10-2, 10-4. Moreover, the synchro motors 8-1, 9-2 may be synchronized with each other.

By using such up and down moving mechanisms, the up and down positions of these sensors are set to optimum positions in accordance with a side of the H-section 11.

Although the synchro motor is used as an actuator for setting the position of the sensor, a hydraulic motor, position setting cylinder and the like may be used.

The truck frame 2 can be moved by the synchro motor 3 as a driving source, so that the size measurement of the H-section can be made at not only on-line state but also off-line state.

Figure 7:
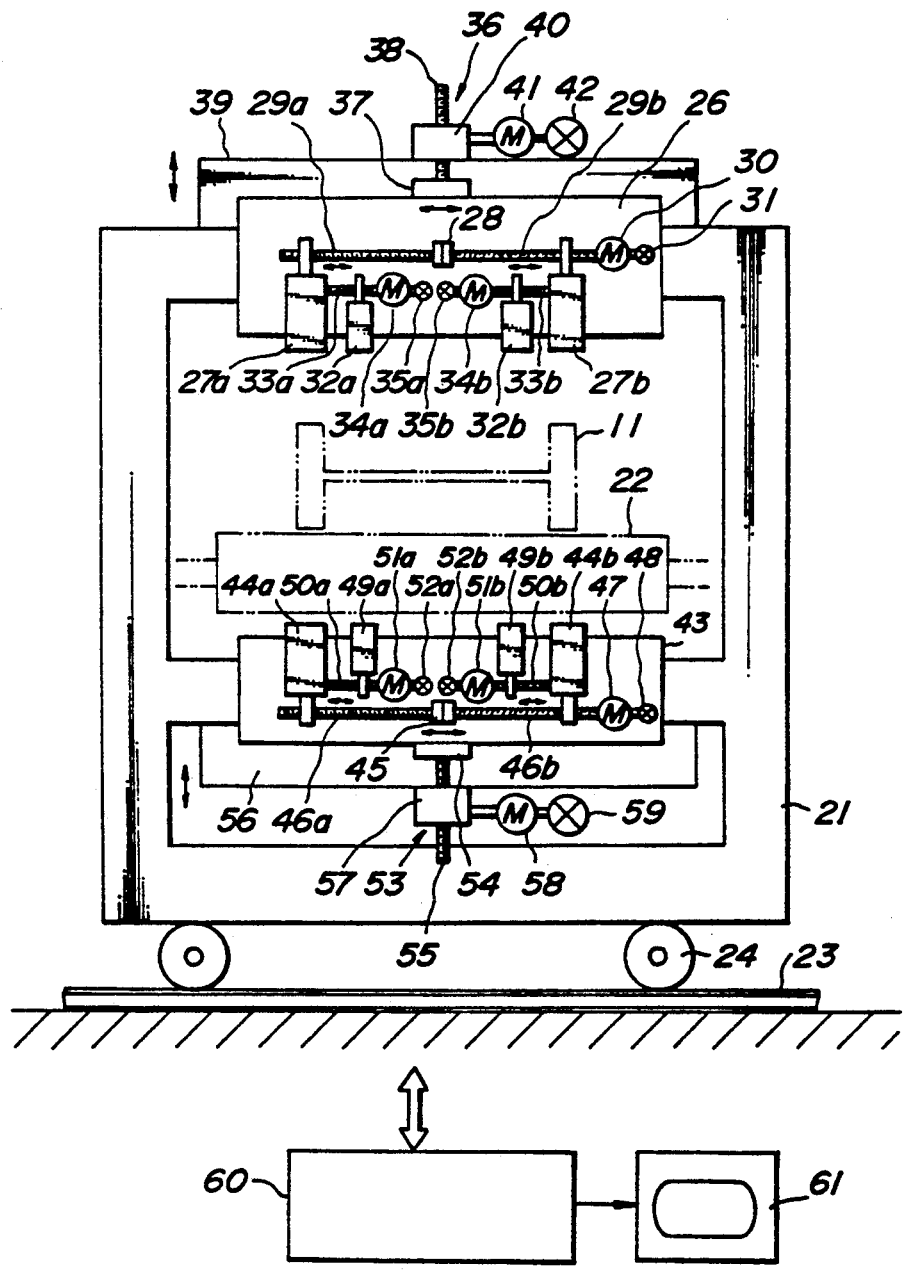
FIG. 7 is a schematic view showing a construction of another apparatus for measuring sizes of H-section.

A second embodiment of the apparatus according to the invention will be described with reference to FIG. 7. In FIG. 7, numeral 21 is a truck frame arranged between transfer rolls 22 for transferring an H-section 11, which is moved on a rail 23 through wheels 24 in a direction perpendicular to the transferring direction of the H-section 11 by means of a driving device (not shown).

Numeral 26 is an upper sensor frame attached to the upper portion of the truck frame 21. Numerals 27a and 27b are devices for the measurement of distance up to an upper end of the flange portion capable of simultaneously determining the flange width and thickness, which are arranged on the upper sensor frame 26 in connection with the upper flange portions of the H-section 11. The distance between the devices 27a and 27b is adjusted by rotating screw shafts 29a, 29b of opposite threaded direction joined with a coupling 28 through the driving of a motor 30. Each of these devices 27a, 27b uses a two-dimensional laser rangefinder comprising He-Ne laser generator generating a band-like laser beam, a collimator and a two-dimensional image sensor detecting laser beams irregularly reflected on the H-section 11, whereby the maximum value of flange thickness can be measured. Moreover, a position detector 31 such as selsyn or the like is connected to a rotating shaft of the motor 30.

Numerals 32a, 32b are devices for measuring a distance up to the upper surface of the web portion in the H-section, i.e. one-dimensional laser rangefinders. The distance between these devices 32a and 32b is adjusted by rotating screw shafts 33a, 33b, an end of each of which shafts being rotatably supported on the side portion of each of the devices 27a, 27b, by the driving of motors 34a, 34b. Moreover, position detectors 35a, 35b such as selsyn or the like are connected to the rotating shafts of the motors 34a, 34b, respectively.

Numeral 36 is an upper-side lifting device for moving the upper sensor frame 26 in up and down directions, in which a screw shaft 38 fixed at its one end to a nut 37 attached to the upper portion of the upper sensor frame 26 is screwed to a worm reduction gear 40 fixed to a frame 39 attached to the upper portion of the truck frame 21. When the worm reduction gear 40 is driven by a motor 41, the screw shaft 38 rotates to lift up the upper sensor frame 26, whereby the distance between the upper sensor frame 26 and the H-section 11 is adjusted. The motor 41 is connected to a position detector 42.

Numeral 43 is a lower sensor frame attached to the lower portion of the truck frame 21. Numerals 44a and 44b are devices for the measurement of distance up to a lower end of the flange portion capable of simultaneously determining the flange width and thickness, which are arranged on the lower sensor frame 43 in connection with the lower flange portions of the H-section 11. The distance between the devices 44a and 44b is adjusted by rotating screw shafts 46a, 46b of opposite threaded direction joined with a coupling 45 through the driving of a motor 47. Each of these devices 44a, 44b uses a two-dimensional laser rangefinder comprising He-Ne laser generator generating a band-like laser beam, a collimator and a two-dimensional image sensor detecting laser beams irregularly reflected on the H-section 11 likewise the devices 27a, 27b. Moreover, a position detector 48 is connected to a rotating shaft of the motor 47.

Numerals 49a, 49b are devices for measuring a distance up to the lower surface of the web portion in the H-section, i.e. one-dimensional laser rangefinders. The distance between these devices 49a and 49b is adjusted by rotating screw shafts 50a, 50b, an end of each of which shafts being rotatably supported on the side portion of each of the devices 44a, 44b, by the driving of motors 51a, 51b. Moreover, position detectors 52a, 52b are connected to the rotating shafts of the motors 51a, 51b, respectively.

Numeral 53 is a lower-side lifting device for moving the lower sensor frame 43 in up and down directions, in which a screw shaft 55 fixed at its one end to a nut 54 attached to the lower portion of the lower sensor frame 43 is screwed to a worm reduction gear 57 fixed to a frame 56 attached to the lower portion of the truck frame 21. When the worm reduction gear 57 is driven by a motor 58, the screw shaft 55 rotates to lift up the lower sensor frame 43, whereby the distance between the lower sensor frame 43 and the H-section 11 is adjusted. The motor 58 is connected to a position detector 59.

Figure 8:
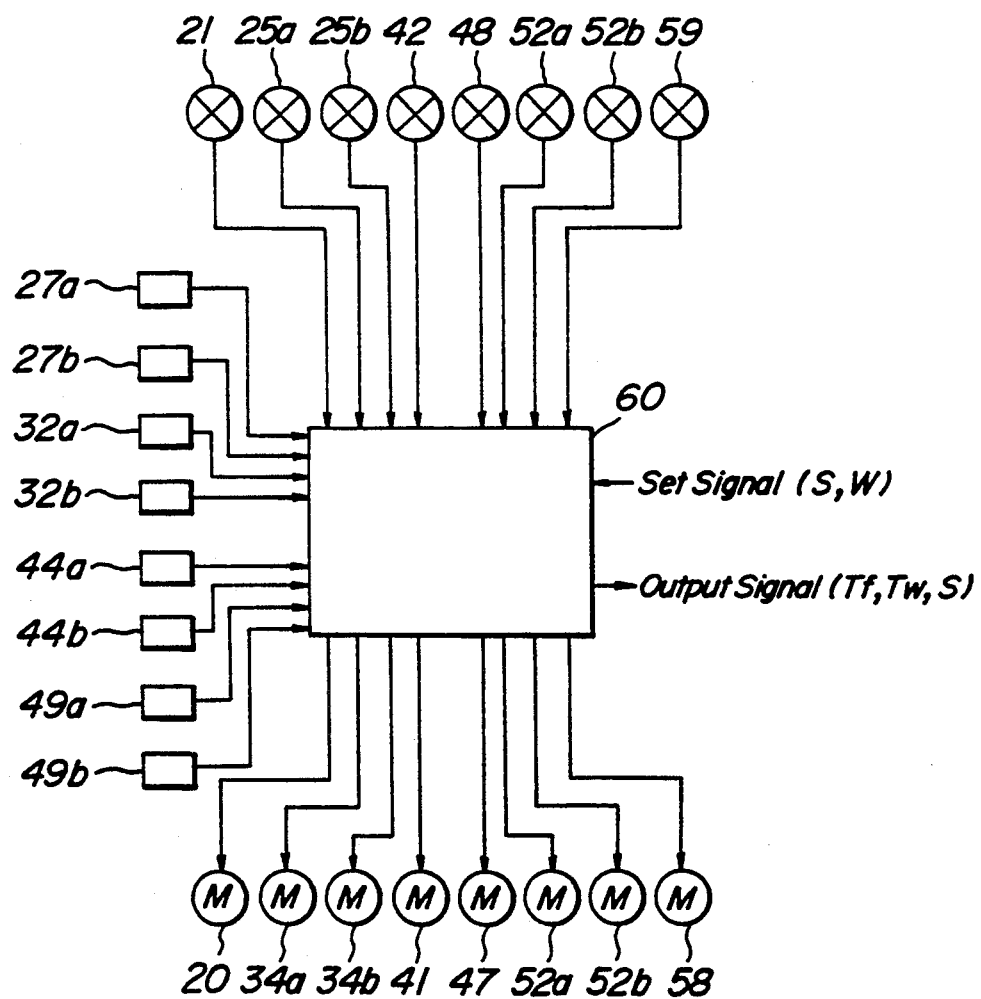
FIG. 8 is a schematic view of a measuring control system in the apparatus of FIG. 7.

Numeral 60 is a central processing unit having functions as shown in FIG. 8. That is, position signals output from the position detectors and size informations of the H-section 11 such as flange width, web height and the like are input into the central processing unit 60, from which position setting signals are output into the motors to conduct the positioning of the devices. At the same time, signals output from the devices are input into the central processing unit 60, at where the flange width B, flange thickness $T_f$, web thickness $T_W$ and deviation at center S of the H-section 11 are calculated, and then signals of the calculated values are output into a displaying device 61.

The operation of the above measuring apparatus will be described below.

Figure 9:
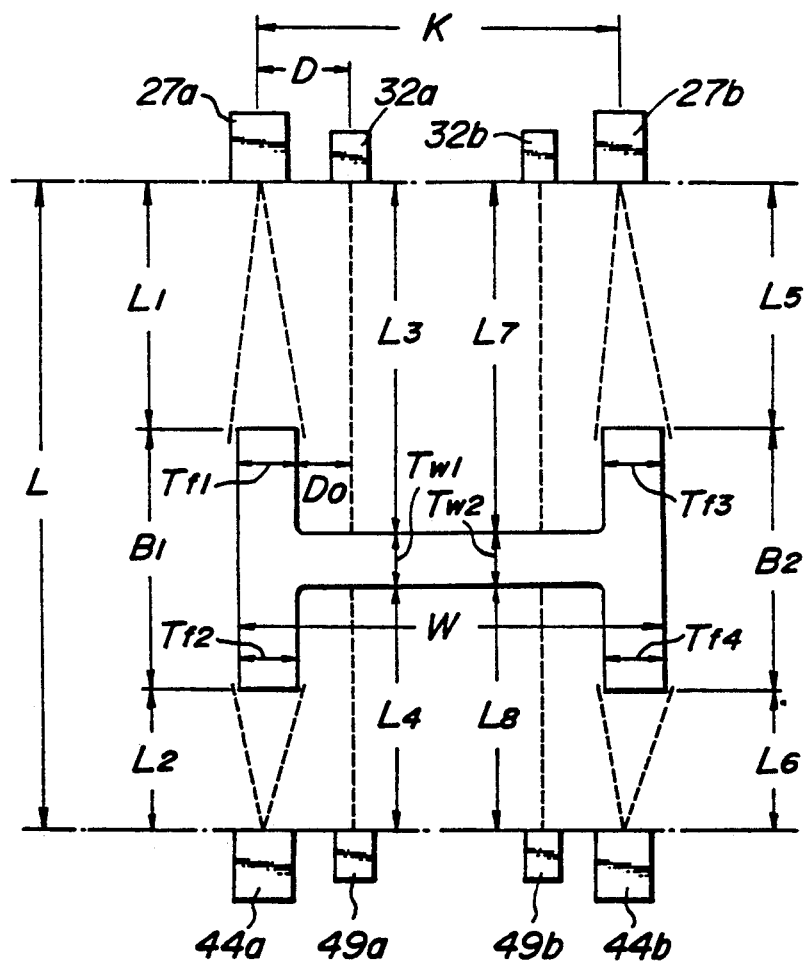
FIG. 9 is a schematic view showing an actual operation of the apparatus shown in FIG. 7.

(1) The distances of the devices up to the H-section are set based on size informations of the H-section to be measured (flange width B, web height H) previously input and set in the central processing unit 60. That is, the motors 41 and 58 are driven in accordance with the flange width B so as to adjust distances from the devices 27a, 27b to the devices 44a, 44b in a height direction to a distance L as shown in FIG. 9, respectively. On the other hand, the motors 30 and 47 are driven in accordance with the web height W so as to adjust distance between the devices 27a and 27b and distance between the devices 44a and 44b in a horizontal direction to a distance K, respectively. Moreover, it is necessary that the flange portion of the H-section 11 is sandwiched between the devices 27a and 44a and between the devices 27b and 44b.

(2) The distances $L_1$, $L_2$, $L_5$, $L_6$ up to the upper and lower edges of the flange portion and the thicknesses $T_{f1}$, $T_{f2}$, $T_{f3}$, $T_{f4}$ thereof are simultaneously measured by the devices 27a, 27b, 44a and 44b. Then, the left and right flange widths $B_1$, $B_2$ are calculated according to the following equations:

$$B_1 = L - (L_1 + L_2)$$

$$B_2 = L - (L_5 + L_6)$$

Further, a maximum value Tfm of the flange thickness is selected from the measured values $T_{f1}$, $T_{f2}$, $T_{f3}$ and $T_{f4}$.

(3) A distance D from each of the devices 27a, 27b, 44a, 44b to each of the respective devices 32a, 32b, 49a, 49b is calculated according to the following equation using the maximum flange thickness $T_{fm}$ of the above item (2), whereby the motors 34a, 34b, 51a, 51b are driven for the positioning of the devices 32a, 32b, 49a, 49b.

$$D = D_0 - (T_{fm}/2)$$

Moreover, $D_0$ is a distance from each of the devices 32a, 32b, 49a, 49b to an inner surface of the flange portion (provided that this distance is a constant value most suitable for the measurement).

(4) Next, the distances $L_3$, $L_4$, $L_7$, $L_8$ up to the upper and lower surfaces of the web portion are measured by the devices 32a, 32b, 49a, 49b, from which web thicknesses $T_{w1}$, $T_{w2}$ are calculated according to the following equations:

$$T_{w1} = L - (L_3 + L_4)$$

$$T_{w2} = L - (L_7 + L_8)$$

(5) Furthermore, the deviations at center $S_1$, $S_2$ in a boundary between the flange portion and the web portion are calculated according to the following equations:

$$S_1 = [(L_3 - L_1) - (L_4 - L_2)]/2$$

$$S_2 = [(L_7 - L_5) - (L_8 - L_5)]/2$$

In this way, the sizes of the H-section 11, i.e. left and right flange widths $B_1$, $B_2$, upper and lower flange thicknesses $T_{f1}$, $T_{f2}$, $T_{f3}$, $T_{f4}$, web thicknesses $T_{w1}$, $T_{w2}$ and deviations at center in left and right side of the web portion $S_1$, $S_2$ can simultaneously and exactly be measured at an on-line state.

A third embodiment of the apparatus for measuring the sizes of the steel section at on-line state according to the invention will be described with reference to FIG. 10.

In FIG. 10, numeral 101 is a truck, numeral 102 a rail straightly guiding the truck 101 therealong in forward and backward directions, numeral 103 a wheel running on the rail, and numeral 104 a driving motor for the movement of the truck 101. To front and back end portions of the truck 101 are screwed vertical screw shafts 105, 106 fixed at the other ends to a rectangular frame 107, whereby the frame 107 is supported at a vertically liftable state. Numeral 108 is a driving motor for the lifting up and down of the screw shafts, numeral 109 a transmission shaft, and numeral 110, 111 gear boxes.

The rectangular frame 107 is provided at its inside with a pair of horseshoe support frames 112, 113 facing to each other, at least one (left side in FIG. 10) of which support frames being moved so as to approach toward and separate away from the other support frame (right side). In the illustrated embodiment, the horseshoe support frame 112 is guided on an upper frame portion 114 of the rectangular frame 107 acting as a guide rail and is movable against the horseshoe support frame 113 supported by and fixed to the upper frame portion 114. Numeral 115 is a wheel running on the guide rail, numeral 116 a small truck, numeral 117 a driving motor, and numeral 118 a transmission shaft.

Of course, both the horseshoe support frames 112, 113 may be moved by hanging and supporting on the above small truck 116.

As shown in FIG. 11, base portions 119, 120 of the horseshoe support frames 112, 113 are provided at their opposed inner surfaces with laser rangefinders 126, respectively, while foot portions 121, 122, 123, 124 of the horseshoe support frames 112, 113 are provided at their opposed inner surfaces with laser rangefinders 128, respectively.

As seen from FIG. 11, the laser rangefinders 126 arranged in the base portion 119, 120 can measure the web height of the H-section 11, while the laser rangefinders 128 arranged in the foot portions 121, 122, 123, 124 can measure the flange width and deviation at center of the H-section, respectively. Moreover, each of the laser rangefinders 128 is a set of two-dimensional rangefinder and a one-dimensional rangefinder as shown in FIG. 3.

The measuring position of the apparatus at on-line state as shown in FIG. 11 is previously determined by moving the small truck 116 through the driving motor 117 in accordance with the web height of the H-section 11 to be rolled so as to adjust the distance between the horseshoe support frames 112 and 113. In the illustrated embodiment, the centering of the apparatus is determined by moving the rectangular frame 107 through the driving motor 104 for the truck 101 in horizontal direction and through the driving motor 108 in the vertical direction so as to match the hanging height of the horseshoe support frames 112, 113 with a center of width in accordance with the flange width of the H-section 11.

Thus, the sizes of the steel section (H-section in the illustrated embodiment) passing through a rolling pass line are easily measured over the full length thereof (as shown in FIG. 11). The measured values are fed back to the operation of the rolling mill while being checked with the target sizes of the H-section, whereby the desirable rolled product can be obtained. As the stable operation is established and continued, the size measurement is not required, so that the truck 101 and hence the whole of the rectangular frame 107 are escaped in a position of an off-line side of the rolling mill (not shown) by the driving motor 104 immediately after the tail end of the H-section passes through the rectangular frame, whereby the occurrence of troubles such as thrusting of the steel section into the measuring device and the like is not caused even if the warping or bending is produced in the top end of the steel section. Of course, the above procedure is repeated for each requirement of the size measurement.

The operation of the site measuring device shown in FIGS. 10 and 11 will be described with reference to FIGS. 12 to 15. In this case, the rail 102 guiding the movement of the truck 101 is arranged on a support table 125 extending in a direction perpendicular to the rolling pass line just after a finish universal rolling mill of the steel section (not shown). The support table 125 is rigidly supported by support stands 126, 127 extending over the rolling on-line and support stand 128 located at off-line extension side of the rolling mill.

Numerals 129 is a bundle of cables feeding power to the driving motor 104 for the truck 101 and the driving motor 108 for the rectangular frame 107, and each of numerals 130, 131 a bundle of cables feeding power to the driving motor 117 for moving the horseshoe support frame 113 against the horseshoe support frame 112 together with the lifting of the rectangular frame 107. Moreover, these cable bundles 129, 130, 131 include signal transmitting means from the laser rangefinders 126, 128 shown in FIG. 11.

In FIG. 13, numerals 132, 133, 134 are guides for guiding the vertically lifting movement of the rectangular frame 107.

According to the above structure, the web height flange widths at operation side and driving side of the rolling pass line, deviation at center, web thickness at the measuring position and further web thickness by proper movement of the horseshoe support frame 119 can be measured at on-line state of H-section or I-section during the hot rolling. Furthermore, when flat steels or steel sheet piles are hot rolled, their full width and thickness at optional position can be measured.

Although the movement of the horseshoe support frame 113 against the horseshoe support frame 112 fixed to the rectangular frame 107 has been described in the illustrated embodiment, which is to simplify the driving systems for decreasing factors of the accuracy reduction and reducing the cost, it is naturally possible to separately control the horseshoe support frames 112 and 113 in accordance with the height and distance adjustment for the measurement. In the latter case, after the truck 101 is moved to a target position in the on-line for the rolling, the positions of both the horseshoe support frames 112, 113 are controlled by centering process.

In any case, it is naturally desired that the horseshoe support frames 112, 113 as well as members continuously exposed to high temperature from hot rolled steel sections are made from materials hardly subjected to thermal influence, or are properly provided with a heat-insulative or cooling means.

In the above-embodiments of the apparatus for the size measurement of the steel sections, it is necessary to calibrate the laser rangefinder before the starting of the measurement for ensuring the measuring accuracy, whereby the image forming position is corrected so as to match with the distance value of the image sensor. Furthermore, it is necessary to rotate the rotating member at a constant speed for averaging the scattering of surface roughness or reflectivity. For this purpose, disc-like calibrating members as shown in FIGS. 16a to 16d having different notch positions and phases are adopted, whereby the image forming position can optionally be selected.

In the calibrating members shown in FIGS. 16a and 16b, a notch E is arranged in a rotating calibration face D so as to shift the phase by 180°. In the calibrating member of FIG. 16c, the rotating calibration face D has a pair of opposed notches $E_1$, $E_2$. In the calibrating member of FIG. 16d, the rotating calibration face D shown in FIG. 16a is divided by a step difference s into two rotating calibration faces $D_1$, $D_2$.

Such disc-like calibrating members are placed at multi-stages of given interval on a calibration spindle supported by a frame as shown, for example, in FIGS. 17 and 18. Since a notch of any disc-like calibrating member among these members is existent according to the rotating position and also a distance of the irradiated laser beam up to a reflecting face can be defined by a distance between the known disc-like members, the data can be obtained in accordance with the distance up to the surface of each of the disc-like calibrating members by assembling these members at multi-stage as shown in FIGS. 17 and 18. Thus, the linearity of the sizes in the vicinity of the steel section to be measured can be determined within a wide range.

In this way, the linearity is guaranteed against not only the vertical movement but also the horizontal movement of the steel section to be measured, so that the guidability before and after the rangefinder (guiding reinforcement by the arrangement of guide member) can somewhat be loosened.

Further, the linearity of deviation at center and web thickness in the H-section as shown in FIG. 2 can be checked by using the multi-stage rotating disc-like calibrating members. Particularly, the flange width, deviation at center and web thickness can advantageously be calibrated at once by arranging a pair of calibration spindles each provided with the disc-like calibrating members at left and right sides of the H-section.

Moreover, there is a web height in the size measurement of the H-section, which can be calibrated by using the same multi-stage rotating calibration members as mentioned above (FIGS. 17, 18).

Therefore, the size measurement of the steel sections can be carried out by the calibration device calibrated in the same series with a high accuracy in a short time and further can be automated, so that it can sufficiently be adapted to an existing environment in the actual measurement.

In the embodiment of FIGS. 17 and 18, an arrangement of laser rangefinders is shown in FIG. 19.

As the laser rangefinder, a set 201 of two-dimensional laser rangefinder and one-dimensional laser rangefinder for measuring flange width B, foot lengths $b_1$, $b_2$ and web thickness $T_w$ of an H-section 11 as shown in FIG. 2 is arranged on a truck frame 203, which moves from on-line position to off-line position across the rolling pass line of the H-section, at left and right side positions and upper and lower side positions thereof, and also a pair 202 of laser rangefinders for measuring the web height H are arranged on the frame 203 at left and right side positions thereof as shown in FIG. 19.

In FIG. 19, numerals 204a, 204b are measuring units including a pair of left and right rangefinder sets moving in a vertically lifting direction, in which these rangefinder sets are moved to each other in a horizontal direction. Numerals 205a, 205b are driving motors, numerals 206a, 206b are screw shafts of opposite-threaded direction, numerals 207a, 207b are driving motors, numerals 208a, 208b are worm gears, numerals 209a, 209b are driving motors for the laser rangefinder 202, and numerals 210a, 210b are screw shafts of opposite-threaded direction, respectively.

At the on-line position of the truck frame 203, a linear railway 211 is arranged along the moving direction of the frame 203 as shown in FIG. 18, and a calibration table 212 is placed on the linear railway 211. The calibration table 212 is provided with a feeding spindle 213, which can slidably be moved on the linear railway 211 through a driving motor 214 (see FIG. 18).

On the linear railway 211 is placed a saddle 215 provided with a guide shoe 216. This guide shoe 216 is adapted to another linear railway 217 and can be slided thereon through a hydraulic motor 218. Numeral 219 is a connecting arm. Moreover, the linear railways 211 and 217 are crossed with each other.

Onto the calibration table 212 are arranged upper and lower brackets 220, 221, between which brackets is born a vertical calibrating spindle 222, and further a cantilevered bracket 223 is arranged so as to bear a horizontal calibrating spindle 224.

These spindles 222, 224 are rotated by a driving motor 225 through belt driving mechanisms 226, 227; 226, 228, respectively.

In the calibration of the laser rangefinder set 201 for the measurement of flange width B, flange foot lengths $b_1$, $b_2$ and web thickness Tw of the H-section shown in FIG. 2, disc-like calibrating members 229, 230 each having a notch E as shown, for example, in FIGS. 16a, 16b are fixed to the vertical calibrating spindle 222 together with a disc-like calibrating member 231 having no notch as well as another spare calibrating members 232, 233.

In the starting of the calibration, the calibration table 212 is slided on the linear railway 217 to a given position by the hydraulic motor 218. In the course of the sliding, the driving motor 215 is driven by a signal from a limit switch (not shown) to conduct the calibration of the laser rangefinder after the stopping of the table 212 just beneath the laser rangefinder 201. After the rotating of the driving motor 215 is stopped with the lapse of given time, the calibration table is slided to an off-line position to complete the calibration.

Next, the calibration of web height will be described.

Disc-like calibrating members 234, 235 are used and fixed to the horizontal calibrating spindle 224 and rotated by the driving motor 225 through the belt driving mechanisms 226, 228 at a constant speed, whereby the calibration of the laser rangefinders 202 can be conducted.

Although the calibrations of the flange width and web height can simultaneously be conducted according to the arrangement of the laser rangefinders, when the rangefinders are arranged at different positions as shown in FIGS. 17 and 18, it is possible to adopt such a system tha the calibration table is stopped at once before the calibration of the flange width or this table is stopped by a limit switch at an advanced position after the calibration of the flange width.

In any case, the driving motor 225 is stopped after all of the calibrations.

In the above illustrated embodiment, the calibration table 212 is moved in horizontal direction because the measuring range of web height H shown in FIG. 2 is wide. That is, this system means that the web height is met with the size of the H-section to be measured.

In this case, the calibration table 212 is moved on the linear railway 211 by the driving motor 214 (see FIG. 17) through the feeding spindle 213, in which the moving quantity is exactly measured by means of a linear scale or the like (not shown) according to the input of calibration starting signal.

This system is advantageous as an avoidance procedure when the web height is as low as 300 mm because the calibrating members interfere with each other in case of such a low web height and can not be rendered into multi-stage.

As seen from the above, according to the invention, the acceptable degree against the rolling phenomenon of the steel section during the running can be made large and the edge shape of the flange portion can be sufficiently taken by combining the two-dimensional laser rangefinder with the one-dimensional laser rangefinder, whereby the measuring accuracy can be improved in the size measurement of the steel section. Therefore, the quality and yield of steel sections can be improved by adopting the measuring process according to the invention.

Furthermore, the flange width and flange thickness can simultaneously be measured by arranging a pair of opposed two-dimensional laser rangefinders so as to sandwich each flange portion of the steel section from up and down directions thereof. Moreover, the distance up to the web surface is measured by combining the one-dimensional laser rangefinder with the two-dimensional laser rangefinder at an optionally adjustable interval. Therefore, even if the flange thickness varies, the flange width, deviation at center and web thickness can simultaneously be measured while maintaining the distance between the inner face of the flange portion and the one-dimensional laser rangefinder at a constant value. As a result, the sizes of the steel section can exactly be measured at an on-line state, so that the invention largely contributes to the improvement of the productivity and the energy-saving.

In addition, when the apparatus for the size measurement according to the invention is arranged at a rear side of a finish universal rolling mill in a large scale factory, it becomes possible to avoid troubles in no use and measure all sizes of H-sections, I-sections, flat sheets and the like produced in the factory by combining the three driving systems as previously mentioned, and also data are instantly output over full length of each section, so that the time required for the adjustment of the rolling mill is reduced and the quality maintenance is considerably improved.

Moreover, the compact and cheap apparatus for the size measurement of steel sections at hot rolling state can be provided by combining the same series laser rangefinders.

In measurement through laser rangefinders, the calibration can be conducted with a high accuracy in a short time by arranging disc-like calibrating members at multi-stage without replacing these members each time the size of the steel section is to be measured and also can be automated to attain the energy-saving. Further, even if the laser rangefinders are arranged near to the rolling mill, the sufficient accuracy can be guaranteed against the measuring environment (particularly vibrations).

What is claimed is:

1. A process for measuring sizes of steel sections along a manufacturing line of a hot rolling mill, comprising the steps of:
    arranging at least a pair of two-dimensional rangefinders and at least a pair of one-dimensional rangefinders on opposite sides of a steel section at an on-line state, said steel section comprising a pair of flange portions connected by a web portion;
    measuring a distance from each of the two-dimensional rangefinders to at least one of the flange portions and a distance from each of the one-dimensional rangefinders to the web portion, respectively, said measuring step occurring in an on-line state while the steel section is moving along the manufacturing line; and
    calculating a deviation at a center portion of said steel sections, a flange width and a web thickness from the above measured values.

2. A process according to claim 1, wherein each of the two-dimensional rangefinders and one-dimensional rangefinders is a laser rangefinder.

3. An apparatus for measuring sizes of steel sections including a pair of flange portions and a web portion at an on-line state for rolling, the apparatus comprising a pair of upper two-dimensional rangefinders arranged above the flange portions in the widthwise direction of the steel sections for measuring width and thickness at an upper end of each flange portion, a first device for adjusting a lateral position of the upper two-dimensional rangefinders, a pair of upper one-dimensional rangefinders each attached to a respective one of the upper two-dimensional rangefinders at a distance therefrom in the widthwise direction of the steel sections for measuring a distance to an upper surface of the web portion, a second device for adjusting a vertical position of the upper two-dimensional rangefinders and the upper one-dimensional rangefinders, a pair of lower two-dimensional rangefinders arranged beneath the flange portions in the widthwise direction of the steel sections for measuring width and thickness at a lower end of each flange portion, a third device for adjusting a lateral position of the lower two-dimensional rangefinders, a pair of lower one-dimensional rangefinders each attached to a respective one of the lower two-dimensional rangefinders at a distance therefrom in the widthwise direction of the steel sections for measuring a distance to a lower surface of the web portion, a fourth device for adjusting a vertical position of the lower two-dimensional rangefinders and the lower one-dimensional rangefinders, and a truck supporting the first, second, third and fourth position adjusting devices together and moving between transporting rolls in a direction perpendicular to a pass line of the steel sections.

4. An apparatus according to claim 3, wherein said pair of upper two-dimensional rangefinders and said pair of lower two-dimensional rangefinders are disposed a predetermined distance apart, and said pair of upper one-dimensional rangefinders are disposed said predetermined distance apart, said apparatus further comprising a calculating means for calculating a deviation at a center portion of said steel sections, a flange width and a web thickness from said distances measured by said rangefinders and said predetermined distance.

5. An apparatus for measuring sizes of steel sections including a pair of flange portions and a web portion at an on-line state for rolling, the apparatus comprising a truck arranged in a rolling pass line of the steel sections to linearly and retractably move from an on-line position to an off-line position in a direction perpendicular to the rolling pass line, a vertically adjustable rectangular frame attached to the truck, a pair of horseshoe-shaped support frames arranged inside the rectangular frame in a facing relationship and adapted to be adjusted towards and away from each other, a pair of laser rangefinders arranged in respective opposing inner faces of the horseshoe-shaped support frames, and a set of a two-dimensional rangefinder and a one-dimensional rangefinder arranged in opposing upper and lower faces of each of the horseshoe-shaped support frames.

6. An apparatus for measuring sizes of steel sections along a manufacturing line of a hot rolling mill, said steel sections including a pair of flange portions connected by a web portion, said apparatus comprising:
first means for measuring width and thickness of each flange portion;
second means for measuring thickness of said web portion; said second means being attached to said first means;
means for adjusting a lateral position of said first and second measuring means;
means for adjusting a longitudinal position of said first and second measuring means; and
supporting means for supporting said first and second measuring means in an on-line state while the steel sections are moving along the manufacturing line.

7. An apparatus according to claim 6, wherein said first means comprises first and second two-dimensional rangefinders, said first two-dimensional rangefinder adapted to measure a first end of each flange portion and said second two-dimensional rangefinder adapted to measure a second end of each flange portion.

8. An apparatus according to claim 7, wherein said second means comprises first and second one-dimensional rangefinders, said first one-dimensional rangefinder measuring its distance from a first side of said web portion and said second one-dimensional rangefinder measuring its distance from a second side of said web portion.

9. An apparatus according to claim 8, wherein said first and second two-dimensional rangefinders are disposed a predetermined distance apart and said first and second one-dimensional rangefinders are disposed said predetermined distance apart, said apparatus further comprising a calculating means for calculating a deviation at a center portion of said steel sections, a flange width and a web thickness from said first and second measuring means and said predetermined distance.

* * * * *